Aug. 7, 1962 — O. SUTER — 3,047,961
HIGH ANGLE INCLINATION INSTRUMENT
Filed Oct. 9, 1956 — 2 Sheets-Sheet 1
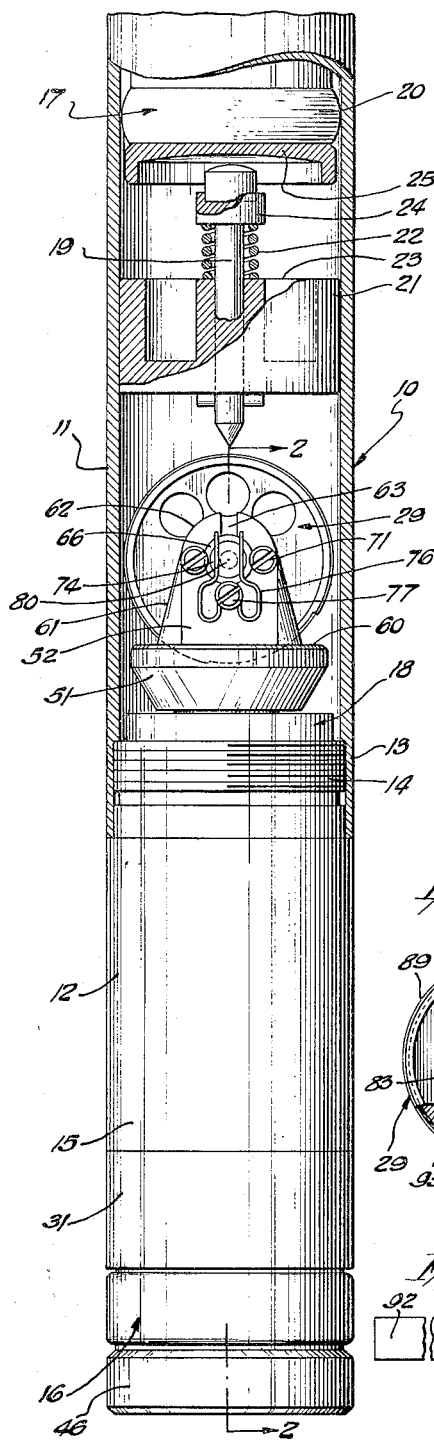
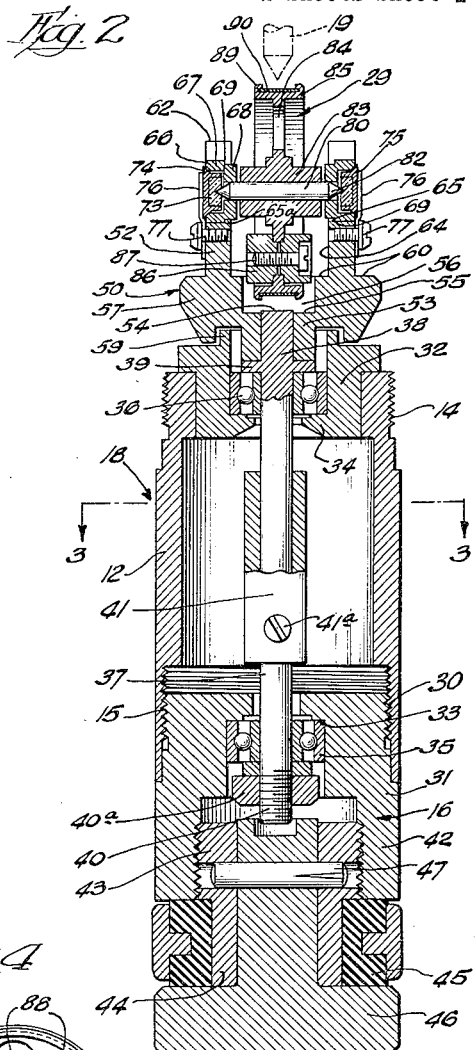
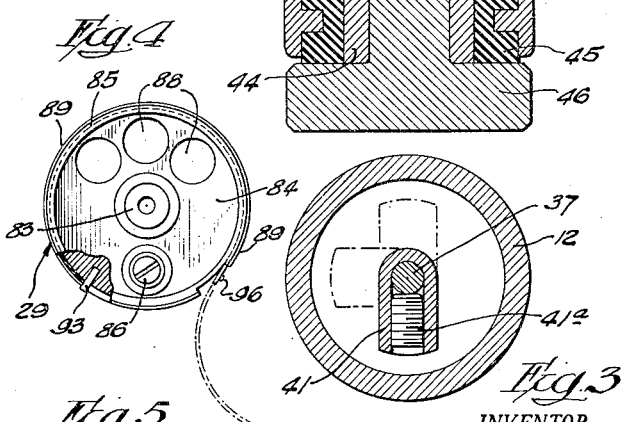
INVENTOR.
OSWALD SUTER
BY Fulwider, Mattingly & Huntley
ATTORNEYS.

Aug. 7, 1962 — O. SUTER — 3,047,961
HIGH ANGLE INCLINATION INSTRUMENT
Filed Oct. 9, 1956 — 2 Sheets-Sheet 2

INVENTOR.
OSWALD SUTER
BY
Fulwider, Mattingly & Huntley
ATTORNEYS.

United States Patent Office 3,047,961
Patented Aug. 7, 1962

3,047,961
HIGH ANGLE INCLINATION INSTRUMENT
Oswald Suter, Los Angeles, Calif., assignor to Technical Oil Tool Corporation, Ltd., Los Angeles, Calif., a corporation of California
Filed Oct. 9, 1956, Ser. No. 614,920
5 Claims. (Cl. 33—205.5)

This invention relates generally to well boring surveying instruments and particularly to an improved positive mechanical device for surveying those well bores which incline greatly from the vertical.

In order to record high angles of inclination it is necessary that the indicating elements be capable of free angular movement through relatively large angles and at the same time means must be provided for marking or recording the amount and direction of such movement. Photographic recording means have been utilized in some high angle instruments but these are not reliable under high temperature conditions, and are difficult to operate at best. Many attempts have therefore been made to provide a high angle instrument of a positive marking or recording type and it is with this kind of instrument that the present invention is concerned.

Accordingly, it is a major object of this invention to provide an improved well surveying instrument of simple but rugged construction, which will measure and record reliably and accurately high angles of inclination of a bore hole.

It is another object of the present invention to provide an improved high angle indicating means in a well surveying instrument which is shock suspended in an extremely simple, durable, accurate, and substantially frictionless manner.

It is still another object of the invention to provide an improved well surveying instrument having high angle indicating means of a rotary wheel or drum type which are adapted to be utilized in conjunction with a positive mechanical reciprocating marking device.

It is also an object of the invention to provide a well survey instrument having an indicator drum which is adapted to carry a removable and permanent record chart that is positively marked to record the inclination of the well bore.

A further object of the invention is to provide means for orienting the indicator drum in the plane of inclination of the well bore prior to the recording thereon.

An additional object of the invention is to provide an indicator drum having means to hold and orient a record chart thereon which allows the record to be easily installed and removed.

A still further object of this invention is to provide an improved well surveying instrument for measuring and recording high angles of inclination in which the true angle of inclination may be amplified to provide a highly accurate record of the inclination of a bore hole.

Further objects and advantages of the present invention will become apparent from the following detailed description of a preferred and modified embodiment thereof, and from the accompanying drawings, in which:

FIGURE 1 is an elevation of the high angle indicating mechanism of the inclination measuring instrument showing the upper portion in axial section;

FIGURE 2 is a longitudinal section taken along the line 2—2 of FIGURE 1;

FIGURE 3 is a transverse section taken along the line 3—3 of FIGURE 2;

FIGURE 4 is a detail of the indicator drum of the high angle indicating mechanism;

FIGURE 5 is a plan view of a chart adapted to fit onto the indicator drum shown in FIGURE 4;

Figure 6:
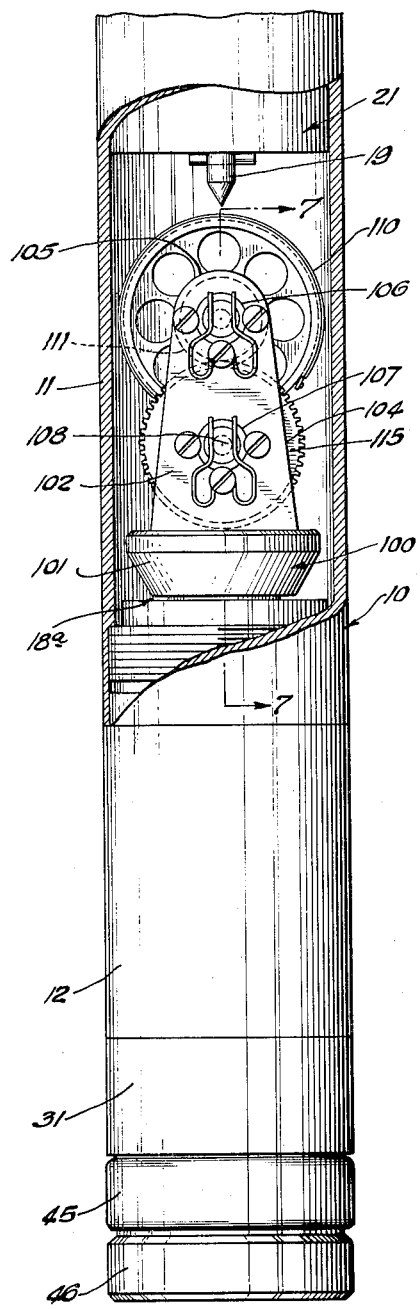
FIGURE 6 is a longitudinal view of a modified embodiment of the high angle indicating mechanism with its upper portion shown in section.

Referring now to the drawings, and particularly to FIGURE 1 thereof, the numeral 10 indicates generally the preferred high angle inclination recording instrument which is enclosed within an upper elongated tubular housing 11 and a lower second tubular housing 12 of the same diameter as the upper housing 11. The two housings 11 and 12 are axially aligned and connected to each other in any suitable manner. For example, housing 11 is internally threaded at the lower end 13 thereof to engage the externally threaded upper end 14 of lower housing 12. The lower end 15 of the lower housing 12 is internally threaded and is closed by a base member assembly 16 to be described. The upper housing 11 is sealed by a cap member (not shown).

The operating elements of the inclination recording instrument 10 comprise a recorder mechanism 17 in the upper section of the housing 11 and a high angle indicating mechanism 18 enclosed within the housings 11 and 12. The recorder mechanism 17 includes a pin-pointed elongated marking element 19, an actuating mechanism 20 which controls the movement of the marking element, and cylindrical guide means 21 spaced below the actuating mechanism and affixed to the housing 11. The guide means 21 has an axial opening extending therethrough to slidably receive the marking element 19.

The marking element 19 is spring loaded upwardly in any suitable manner. For example, a coil spring 22 surrounds the upper section of the marking element 19 and is positioned between the upper face 23 of the guide means 21 and an upper enlarged end 24 of marking element 19 to yieldably hold the latter upwardly.

The actuating mechanism 20 may be any conventional clock-controlled actuating device which reciprocates the disc member 25 mounted at the lower end thereof at a predetermined time to engage and force the marking element 19 axially downward to a marking position. As the disc member 25 returns to its normal position, the spring loaded marking element 19 also returns to a normal position spaced above the marking position.

While not so limited, the high angle indicating mechanism 18 of the present invention is advantageously used in conjunction with that recording and actuating mechanism disclosed in the co-pending applicaiton of Oswald Suter and Alfred J. Abs, entitled "Inclination Recording Instrument," filed September 14, 1950, Serial Number 184,876, now Patent No. 2,775,043 issued December 25, 1956, and reference is made thereto for a detailed disclosure. The recording mechanism therein described, indicated generally at 20 in FIGURE 1, reciprocates the disc 25 mounted in the lower end thereof through multiple cycles of reciprocation at spaced time intervals, thereby permitting successive markings to be made on an appropriate record by the element 19.

Referring now to FIGURE 2, the high angle indicating mechanism 18 includes a rotary indicator wheel or drum 29 which is mounted for rotation about a transverse axis and is weighted so that it tends to remain in a relatively fixed position while the instrument case is inclined in accordance with the direction taken by the well bore. The relative angular position of the wheel with respect to the marking element 19 thus measures the inclination of the well bore from the vertical. However, in order for this to be properly accomplished it is necessary that wheel 29 lie in the plane of inclination of the well bore and for this reason the support for wheel 29 is itself mounted for rotation about the longitudinal axis of the instrument and is urged by an offset weight to take a position of rest positioning wheel 29 in the desired plane of inclination.

Considered in detail it will be seen that the lower housing 12 is internally threaded at its lower end 15 to engage the externally threaded upper end 30 of a cylindrical lower bushing 31 of bore assembly member 16. A second cylindrical bushing 32 is provided within the upper end 14 of housing 12, and each of said bushings 31 and 32 having axially aligned seats 33 and 34 respectively against which abut axially aligned lower and upper bearings 35 and 36 respectively.

An elongated spindle 37 is rotatably mounted in the axis of the housing 12 between said upper and lower bearings 36 and 35, respectively, and has affixed near its upper end 38 a flange 39 which rests on the upper bearing 36. Near the lower threaded end 40 of the spindle 37 is mounted a lower flange which abuts the lower bearing 35, the lower flange being firmly held in place by means of nut 40a. Thus, the spindle 37 is freely rotatable about the axis of the instrument 10 but its upward or downward movement is restricted.

The spindle 37 carries an eccentric weight 41 attached between the upper and lower bushings 36 and 35, respectively, by means of screws 41a. As will be described hereinafter in more detail, the weight 41 acts as a pendulum and seeks the lowest possible position. Thus upon inclination of the instrument, weight 41 tends to rotate spindle 37 until the weight is at the bottom of its circle of travel about the spindle. This causes indicator drum 29 to be aligned in the plane of inclination of the well bore.

The lower bushing 31 is internally threaded at its lower end 42 to engage with an externally threaded annular disc 43. An annular collar 44 having its upper end threaded externally engages the lower internally threaded end 42 of bushing 31 and is spaced below the annular disc 43. A resilient washer 45 tightly surrounds the lower section of collar 42 and is set firmly against the lower end face of bushing 31. The entire base member assembly 16, including the bushing 31, is held firmly in place by a cap 46 which is driven axially through the inner axial openings of the collar 44 and disc 43, the cap 46 being secured by a drive pin 47 which occupies the space formed between the said collar and disc.

A suspension member 50 which carries the indicating wheel 29 is affixed to the upper end 38 of spindle 37 so that as the spindle rotates, the suspension member rotates. The suspension member 50 comprises a transversely circular longitudinally externally tapered annular base 51, a pair of upright parallel posts 52 affixed to the upper face 60 of base 51, and an annular cylinder 53 which is bored to fit over the upper end 38 of spindle 37 so that the cylinder rests on the upper face of the flange 39. The upper transverse end face 54 of the spindle 37 is preferably flush with the upper transverse face 55 of cylinder 53, thereby forming the floor of the axial indicator drum recess 56.

The taper of base 51 extends downwardly to just above the upper transverse end face 57 of upper bushing 32, the lower transverse face of the base 51 therefore lies just above upper face 57 of upper bushing 32. The lower face of base 51 is concentrically grooved to loosely receive a circular lip 59 extending upwardly from upper bushing 32. While there is normally a slight clearance between the lip 59 and the adjoining wall of base 51, contact will be made therebetween under excessive radial loading of spindle 37 to prevent damage to bearings 35 and 36.

Considering now the top of base 51 it will be seen that the parallel support posts 52 project symmetrically and upwardly therefrom.

Each post 52 is shaped in the form of a truncated isosceles triangle having sides 61 which are rounded at the upper ends to form a circular top 62. Aligned, longitudinally extending slots 63, the axes of which are parallel to the axis of housing 11, are provided in posts 52, extending downwardly a short distance from the tops 62 thereof. The lower ends of the slots 63 open into enlarged bores 65 which are provided at the inner end with an internal flange or shoulder 65a.

A pair of annular bushings 66, each consisting of a larger diametered annular cylinder 67 coaxially aligned with a smaller diametered annular cylinder 68 to form an inwardly extending exterior circular shoulder 69, extends transversely through the lower enlarged end of slots 63 until the shoulder 69 rests on flange 65a. Each of the bushings 66 is firmly held in place by a pair of clamping screws 71, each being screwed into a post 52 immediately adjacent and parallel to the bushing so that the edges of the head of said screws overlap a portion of the exterior face of the bushing.

A jewel 73 is mounted in one end of a circular mounting 74, which is formed at the other end with a transversely circular outwardly beveled centering shoulder 75. Each mounting 74, and the jewel 73 contained therein, is axially aligned within one of the bushings 66, the shoulders 75 of each of the mountings impinging upon the exterior face of the bushing and held within the bushing by a hair spring 76 which is affixed to support post 52 by lower clamping screw 77.

Rotatably mounted between said jewel 73 is a cylindrical wheel axle 80 to which is affixed the angle indicator wheel 29. The cylindrical wheel axle 80 has sharply pointed ends 82 at the point of contact with the jewel 73 to minimize friction as it rotates, and is mounted at right angles to the axis of the spindle 37. It will be seen that the mounting thus provided for the axle 80 is such as to prevent excessive wear on jewel 73 or the ends of the axle, for the mountings may move slowly against springs 76 and will be returned to proper alignment by the centering shoulders 75.

The tolerance between the cylindrical axle 80, and the cylinder 68 of the bushing 66, while permitting rotation of the axle, is such that the axle is prevented from substantially any movement in the direction of the instrument axis. It will thus be seen that the mounting provided for the axle 80 is such as to prevent excessive wear on jewels 73, or the ends of the axle 80, due to shocks or severe movement in the direction of the instrument axis, as well as in a direction normal thereto.

The indicator wheel 29 is formed with a sleeve 83 extending through the center thereof, the sleeve having a bore to receive the axle 80 therethrough. Referring now to FIGURES 4 and 5, as well as to FIGURE 2, it will be seen that the outer portion of the wheel 29 comprises a thin, wafer-like circular body 84 attached to the sleeve 83 for supporting an outer circular drum or rim 85. The body 84 has an eccentric weight 86 attached thereon by means of attaching screw 87 and is provided with a number of holes 88 extending therethrough to lighten the wheel 29 and thereby reducing friction at the points of contact between jewel 73 and ends 82 of axle 80. The holes 88 are equally spaced about the axis formed by the center of the weight 86 and the center point of the body 84. It will be appreciated that the weight 86 seeks the lowest possible position and tends to hold the indicator wheel 29 stationary while the instrument is inclined in the well bore. A point at the top of wheel 29 opposed to weight 86 thus remains in a constant upright position regardless of the amount of inclination of the well bore and instrument. It is also to be noted that the axis of wheel 29 is aligned with the offset spindle weight 41 so that both lie in common vertical plane passed through the longitudinal axis of the instrument.

The outer surface of the drum 85 has raised inwardly directed edges 89 forming a channel or groove 90. (See FIGURE 2.) The raised edges 89 do not completely encircle the outer surface of the drum 85 and hence easy insertion of a graduated rectilinear chart 91 within the groove 90 is permitted. The chart 91 is graduated about a zero point, each graduation being equal to two degrees of inclination. Upon insertion of the chart 91 in groove 90 the zero point of the chart is placed directly above the center of mass of the weighted wheel 29, and a mark (not shown) is provided on the outer edges 89 directly above the center of mass to facilitate the positioning of the chart 91. One end 92 of the chart 91, when properly positioned, abuts a zeroing stud 93 affixed to, and protruding from the outer surface of the drum 85. The other end 94 of the chart 91 is provided with a protruding rivet 96 to facilitate the handling of the chart. In operation, the instrument is placed in an outer protective shell and dropped or lowered into the well bore to thereby position the housings 11 and 12 of the instrument 10 in alignment with the axis of the well bore. Prior to this time a predetermined time interval is set on the actuating mechanism 20 so that after the instrument has reached the bottom of the well the disc 25 will be reciprocated as previously mentioned.

As the instrument 10 is being lowered in the bore hole, the cylindrical wheel axle 80 may be thrust in a direction transverse to the axis of the housing 11 or 12. However, the jewel bearings 73 are spring loaded and yield with any transverse thrust of the wheel axle 80. Further, the wheel axle 80 may be thrust in a direction along the housing axis. However, neither the jewel bearings 73 nor the ends of the axle 80 will be harmed because of the close tolerance of the cylinder 68 of the bushing 66 with the axle thereby substantially preventing any axial movement of the axle in the direction of the housing 11 or 12. The contact between the jewel bearings 73 and the wheel axle 80 is thus assured of being relatively frictionless, at the same time also insuring the exact and proper alignment of the wheel 29 when the instrument 10 has come to equilibrium.

After the desired position in the well bore is reached, and after a certain period of time elapses to enable the moving elements within the instrument 10 to come to rest, the spindle 37 assumes a position wherein the eccentrically attached weight 41 is in the lowest possible position. The suspension member 50, being affixed to the upper end 38 of the spindle 37 also rotates therewith and since the longitudinal central plane of the weighted spindle 37 is common to the plane of the wheel 81, the wheel 81 thus lies in the plane of inclination of the bore hole.

The eccentrically weighted wheel 81 then rotates until its eccentric weight 86 rests in the lowermost possible position. In this position, the angle formed by a vertical line passing through the center of mass of the wheel 29 and the axis of the instrument 10 is equal to the angle of inclination of the bore hole. Since a vertical line through the center of mass of the wheel 29 passes through the zero point of the graduated chart, a mark made on the chart along the axis of the instrument will then record the angle of inclination of the bore hole with respect to the vertical.

When the wheel 81 has come to rest and the time interval set into mechanism 20 has passed, the disc 25 is reciprocated downwardly and then upwardly along the axis of the instrument. The pin marking element 19 is forced downward by disc 25, being slidably guided by guide means 21 to strike the chart 91 and is then returned upwardly by the spring 22. After a further short interval of time, the mechanism 20 again actuates the pin marking element 19 by reciprocating disc 25. The pin marking element 19 again strikes the chart 91, and returns to its normal position.

The purpose of multiple marking of chart 91 is to check whether the wheel 81 is at rest when the record is made. Thus both marks on chart 91 should be at the same point, and if they are not, the readings should be disregarded since it will be understood that wheel 81 cannot accurately indicate the inclination of the well bore unless it is at rest.

Figure 7:
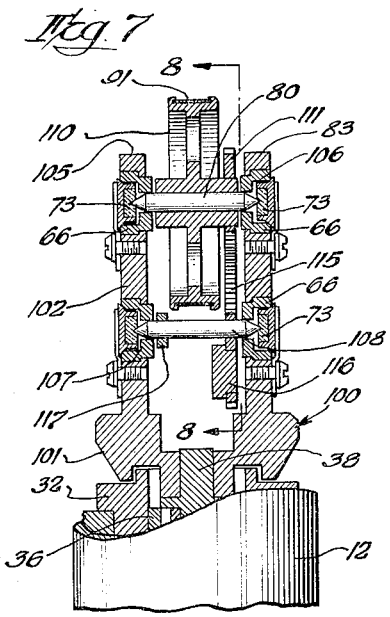
FIGURE 7 is a longitudinal section of the upper portion taken along the line 7—7 of FIGURE 6.
Figure 8:
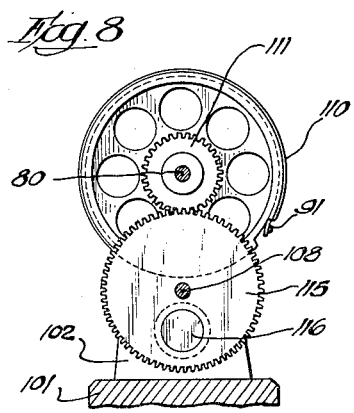
FIGURE 8 is a detail of the indicator drum and gearing taken along the line 8—8 of FIGURE 7.

Referring now especially to FIGURES 6 through 8, a modification of the suspension member of the high angle indicating mechanism 18a is shown which consists essentially of a means for amplifying the angular movement of the chart 91 of the indicator wheel.

The modified suspension member 100 has a base 101 affixed to the upper end 38 of spindle 37 and carrying upright support posts 102. The base 101 is of the same shape as the base of the preferred form, but in this form of the device the posts 102 are elongated vertically in order that they may support a pair of vertically spaced shafts or axles. The posts 102 are of elongated triangular shape having sides 104 and a rounded top portion 105. Each post 102 has an upper opening 106 and lower opening 107 therethrough to receive a bearing mount 66 of the type previously described therein, and the corresponding openings of the two posts are transversely aligned. Jewel bearings 73 are mounted within mounts 66 and spring loaded in place by hair springs 76 for shock resistance.

Extended across between the upper set of bearings 73 is an axle 80 which carries an indicator drum or wheel 110. This wheel is of the same construction as previously described to receive a chart 91 thereon but does not carry an eccentric weight. Also affixed on axle 80 is a spur gear 111. Extended across between the lower set of bearings 73 is a second axle or shaft 114 which has affixed thereon a spur gear 115 meshing with gear 111. The lower gear 115 is of larger diameter than gear 111 providing typically a gear ratio of 2 to 1. Mounted near the periphery of gear 115 is an eccentric weight 116 which tends to seek the lowest possible position as has been previously described. To prevent disengagement of gears 115 and 111 upon axial movement of shaft 108 under shock loads a stop collar 117 may be secured on the shaft adjacent to one of the bearing mounts 66.

By reason of the gear ratio between gears 115 and 111 it will be seen that for any given angular rotation of gear 115 there will be twice as much rotation of gear 111 and indicator wheel 110. This increased movement of indicator wheel 110 permits greater spacing of the degree division marks on the chart 91 so that greater accuracy in reading the chart is possible.

In operation, as the instrument is inclined in accordance with the heading of the well bore the weight 116 tends to hold gear 115 in a fixed position and rotation of the indicator wheel 110 relative to the instrument housing occurs. Whatever the actual amount of inclination, the indicator wheels 110 by reason of the gearing described will rotate through an angular arc of twice this amount and with proper spacing of the degree divisions on chart 91 an expanded scale is provided. It should be noted that since the inclination of the well bore from the vertical will rarely if ever exceed 90°, the circumferential length of wheel 110 provides ample length for the use of such an expanded scale and the gear ratio between the eccentric weight and the indicator wheel may, if desired, be increased over that described.

Marking of the chart on the indicator wheel is accomplished in the same manner as that previously described, and it is not believed necessary to again explain the overall operation of the instrument.

While I have thus shown and described preferred and modified forms of the invention in some detail, it will be understood that other changes of design and construction can be made without departing from the scope of the invention. Therefore I do not wish to be limited to the foregoing except as defined in the appended claims.

I claim:

1. In a high angle well bore inclination measuring instrument: an indicator wheel having an opposed side flanged drum-like surface for slideably receiving thereon a removable elongated chart in circumferential relationship; means mounted on said drum for locating said chart in a predetermined position on said drum; a rotatable member mounted rotatably in the plane of said indicator wheel and carrying an eccentric weight thereon; gear means having a gear ratio gteater than one connecting said member to said wheel whereby angular rotation of said member relative to said instrument causes amplified angular rotation of said wheel; suspension means supporting said indicator wheel and said rotatable member and mounted for rotation about the longitudinal axis of said instrument, the center of said wheel lying on said longitudinal axis, and said suspension means including a suspension member having a pair of spaced, longitudinally extending wall portions with a pair of transversely aligned holes extending therethrough, a pair of bearings spring mounted in said holes so as to be yieldable in a transverse direction, a wheel axle having ends mounted in said bearings and crrrying said indicator wheel thereon, and a bushing mounted in each of said wall portions around each of said bearings and surrounding the ends of said axle in close spaced relationship; eccentric weight means connected to said suspension means for rotating said suspension means and said indicator wheel to place the plane of said rotatable member in a plane parallel with the plane of inclination of the well bore; a marking pin mounted above said indicator wheel in alignment with the longitudinal axis of said instrument, said pin being spring urged to a position spaced from said chart and movable downwardly to engage said chart; and time controlled actuating means for moving said marking means into and out of engagement with said chart.

2. A high angle well bore inclination measuring instrument which comprises: a cylindrical housing; a spindle positioned on the axis of said housing, and rotatable on said axis; an eccentric weight carried by said spindle; a suspension member affixed to the upper end of said spindle and rotatable therewith comprising an annular base of less diameter than said housing and a pair of upwardly extending axially parallel posts affixed to said base; means defining a pair of transversely aligned holes extending through said posts; a pair of jewelled bearings spring mounted in each of said holes so as to be yieldable in a transverse direction; a wheel axle having pointed ends, rotatably and transversely mounted between said spring mounted jewelled bearings; an indicator wheel affixed to said wheel axle between the said ends thereof, the plane of the wheel lying parallel to the plane formed by the point center of mass and the axis of the housing and passing through the axis of the said instrument; an indicator drum affixed to the periphery of said wheel and parallel to the said wheel axle; an eccentric weight operatively attached to said wheel to cause said wheel to rotate; a flexible strip graduated in degrees removably mounted on the outer surface of said drum, the zero point of the said graduations lying in the axis of the housing when said instrument is vertical; an axially aligned pin-marking element slidably positioned above the said wheel; and an actuating mechanism actuating said marking element to engage said strip on said indicator drum to make a mark thereon indicating the angle of inclination of the bore hole.

3. A high angle well bore inclination measuring instrument which comprises: a cylindrical housing; a spindle positioned in the axis of said housing and rotatable therein; an eccentric weight carried by said spindle; a suspension member affixed to the upper end of said spindle and rotatable therewith comprising an annular base of less diameter than said housing and a pair of upwardly extending axially parallel posts affixed to the upper surface of said base; means defining a pair of upper transversely aligned holes extending through said posts; means defining a second pair of transversely aligned holes extending through said posts and longitudinally aligned with each of said upper holes; jewelled bearings spring mounted in each of said holes so as to be yieldable in a transverse direction; a primary shaft having pointed ends rotatably and transversely mounted between the said lower spring mounted jewelled bearings; an ecentrically weighted primary gear wheel affixed normal to said transversely mounted shaft; an upper wheel axle having pointed ends rotatably and transversely mounted between said upper spring mounted jewelled bearings; an indicator wheel mounted on said axle between the said ends thereof, the plane of the wheel lying parallel to the plane formed by the point center of mass of the weighted spindle and the axis of the said housing and passing through the said axis of the instrument; an indicator drum affixed to the periphery of said wheel and parallel to the wheel axis; a secondary gear wheel affixed to the sleeve of said indicator wheel and parallel to the plane of said indicator wheel, the said secondary gear wheel engaging with said primary gear wheel and the gear ratio between the primary gear wheel and the secondary gear wheel being greater than one thereby to amplify the rotation of the primary gear wheel and transmit the amplified rotation to the indicator wheel a flexible strip graduated in degrees removably mounted on the outer surface of said drum, the zero point of said graduations lying in the axis of the housing when said instrument is vertical; an axially aligned pin marking element slidably positioned above the said wheel, the said marking element engageable with the said strip on the said indicating drum to make a mark thereon indicating the angle of inclination of the bore hole.

4. A high angle well bore inclination measuring instrument which comprises: a cylindrical housing, a spindle positioned in said housing with the longitudinal axis of the spindle parallel with the axis of said housing and rotatable upon said longitudinal axis; a weight carried by said spindle eccentric to its said longitudinal axis; a suspenson member affixed to said spindle and rotatable therewith comprising a base member carrying a pair of axially extending posts affixed to said base; means defining a pair of transversely aligned holes extending through said posts; a jewel type pivot bearing spring mounted in each of said holes so as each to be yieldable in transverse directions; a wheel axle having pointed ends, rotatably and transversely mounted between the pivots of said spring mounted bearings; an indicator wheel affixed to said wheel axle between said ends thereof, the plane of the wheel lying parallel to the plane defined by the center of mass of said spindle and eccentric weight and the axis of said spindle; an indicator drum affixed to the periphery of said wheel and coaxial with said wheel axle; a weight operatively attached to said wheel, eccentric to said wheel axle to cause said wheel to rotate under the influence of gravity to a predetermined angular position relative to the vertical; a graduated flexible strip removably mounted on the outer surface of said drum, said strip having a reference point lying in a predetermined angular position relative to the axis of said spindle when said instrument is vertical; a marking element movably positioned axially of said spindle adjacent the said outer surface of said drum; and an actuating mechanism for moving said marking element axially of said spindle into engagement with said strip on said indicator drum to make a mark thereon indicative of the angular position of said wheel relative to the axis of said spindle, thereby indicating the vertical angle of inclination of the axis of the instrument housing.

5. A high angle well bore inclination measuring instrument which comprises: a cylindrical housing; a spindle positioned in said housing with the longitudinal axis thereof parallel wth the axis of said housing and rotatable therein about said longitudinal axis; a weight carried by said spindle eccentric to its said longitudinal axis; a suspenson member affixed to the upper end of said spindle and rotatable therewith comprising a base of less diameter than said housing and a pair of axially extending posts affixed to the upper surface of said base; means defining a pair of upper, transversely aligned holes extending through said posts; means defining a pair of lower, transversely aligned holes extending through said posts and longitudinally aligned parallel with each of said upper holes; a jewel type pivot bearing spring mounted in each of said holes so as each to be yieldable in a transverse direction; an upper wheel axle having pointed ends rotatably and transversely mounted between the pivots of the upper spring mounted bearings; a lower shaft having pointed ends rotatably and transversely mounted between the pivots of the lower spring mounted bearings; an indicator wheel mounted on said upper wheel axle, the plane of the wheel lying upon the said axis of the spindle; an indicator drum coaxially affixed to the periphery of said indicator wheel; a primary gear wheel coaxially connected to said indicator wheel; an eccentrically weighted secondary gear wheel mounted on said lower shaft, the plane of said secondary gear wheel lying parallel to the plane defined by the center of mass of the eccentrically weighted spindle and said longitudinal axis of said spindle and engaging with said primary gear wheel, and the gear ratio between the secondary gear wheel and the primary gear wheel being greater than one, thereby to amplify the rotation of the primary gear wheel and transmit amplified rotation to said indicator wheel; a graduated flexible strip removably mounted on the outer surface of said drum, the zero point of the graduations thereof lying in predetermined relation to said axis of the said spindle when said instrument is vertical; a marking element positioned axially of said spindle adjacent said drum, said marking element being movable axially of said spindle into engagement with the said strip on said drum to make a mark thereon indicative of the angular position of said drum relative to said axis of said spindle, thereby indicating the vertical angle of inclination of the axs of the instrument housing.

References Cited in the file of this patent

UNITED STATES PATENTS

| | | |
|---|---|---|
| 852,013 | Brown | Apr. 30, 1907 |
| 1,257,090 | Mattoon | Feb. 19, 1918 |
| 1,619,317 | Smith | Mar. 1, 1927 |
| 2,022,452 | Aegerter | Nov. 26, 1935 |
| 2,116,120 | Malmgren | May 3, 1938 |
| 2,166,472 | Lake et al. | July 18, 1939 |
| 2,205,022 | Tipter | June 18, 1940 |
| 2,272,336 | Coulomb | Feb. 10, 1942 |
| 2,313,168 | Opocensky | Mar. 9, 1943 |
| 2,624,952 | MacLogan | Jan. 13, 1953 |
| 2,770,887 | Barnett et al. | Nov. 20, 1956 |

FOREIGN PATENTS

| | | |
|---|---|---|
| 186,549 | Germany | June 24, 1907 |
| 807,913 | Germany | July 9, 1951 |
| 1,060,217 | France | Nov. 18, 1953 |